United States Patent
MaCaulay

(10) Patent No.: US 9,118,702 B2
(45) Date of Patent: Aug. 25, 2015

(54) SYSTEM AND METHOD FOR GENERATING AND REFINING CYBER THREAT INTELLIGENCE DATA

(75) Inventor: Tyson MaCaulay, Ottawa (CA)

(73) Assignee: BCE Inc., Montreal (CA)

( * ) Notice: Subject to any disclaimer, the term of this patent is extended or adjusted under 35 U.S.C. 154(b) by 494 days.

(21) Appl. No.: 13/192,152

(22) Filed: Jul. 27, 2011

(65) Prior Publication Data

US 2015/0207809 A1    Jul. 23, 2015

Related U.S. Application Data

(60) Provisional application No. 61/491,551, filed on May 31, 2011.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC .......... *H04L 63/14* (2013.01); *H04L 29/06877* (2013.01); *H04L 63/1425* (2013.01); *H04L 29/06897* (2013.01); *H04L 63/1408* (2013.01)

(58) Field of Classification Search
CPC ........................ H04L 63/14–63/1425; H04L 29/06877–29/06897
USPC ................................ 726/22, 23, 25
See application file for complete search history.

(56) References Cited

U.S. PATENT DOCUMENTS

| 7,089,428 B2 | 8/2006 | Farley et al. |
| 7,849,502 B1 | 12/2010 | Bloch et al. |
| 7,895,649 B1 * | 2/2011 | Brook et al. ............. 726/22 |

(Continued)

FOREIGN PATENT DOCUMENTS

| KR | 20040038168 | 5/2004 |
| KR | 20090060718 | 6/2009 |

(Continued)

OTHER PUBLICATIONS

International Search Report issued on Apr. 10, 2012 in connection with International Patent Application PCT/IB2011/002858, 5 pages.

(Continued)

*Primary Examiner* — Evans Desrosiers
*Assistant Examiner* — Daniel Potratz
(74) *Attorney, Agent, or Firm* — Gowling Lafleur Henderson LLP

(57) ABSTRACT

A method of refining cyber threat intelligence data, comprising: sending a first version of a threat list to a first cyber threat intelligence source and to a second cyber threat intelligence source; obtaining original first cyber threat intelligence data from the first source; obtaining original second cyber threat intelligence data from the second source; creating a second version of the threat list based on at least the original first cyber threat intelligence data and the original second cyber threat intelligence data; sending the second version of the threat list to the first source and to the second source; obtaining new first cyber threat intelligence data from the first source; obtaining new second cyber threat intelligence data from the second source; and creating a third version of the threat list based on at least the new first cyber threat intelligence data and the new second cyber threat intelligence data.

17 Claims, 5 Drawing Sheets

(56) References Cited

U.S. PATENT DOCUMENTS

| | | | |
|---|---|---|---|
| 8,205,259 B2* | 6/2012 | Stute | 726/23 |
| 8,402,543 B1* | 3/2013 | Ranjan et al. | 726/23 |
| 2006/0253581 A1 | 11/2006 | Dixon et al. | |
| 2007/0067848 A1* | 3/2007 | Gustave et al. | 726/25 |
| 2008/0082662 A1 | 4/2008 | Dandliker et al. | |
| 2008/0148398 A1 | 6/2008 | Mezack et al. | |
| 2008/0229422 A1* | 9/2008 | Hudis et al. | 726/25 |
| 2009/0328209 A1 | 12/2009 | Nachenberg | |
| 2010/0115040 A1 | 5/2010 | Sargent et al. | |
| 2011/0173699 A1* | 7/2011 | Figlin et al. | 726/23 |
| 2012/0079592 A1* | 3/2012 | Pandrangi | 726/22 |

FOREIGN PATENT DOCUMENTS

| | | |
|---|---|---|
| KR | 20110008855 | 1/2011 |
| WO | WO2011/019720 | 2/2011 |

OTHER PUBLICATIONS

Written Opinion of the International Searching Authority issued on Apr. 10, 2012 in connection with International Patent Application PCT/IB2011/002858, 8 pages.

MaCaulay, T. et al., "Delivery Options for Upstream Intelligence", IAnewsletter, The Newsletter for Information Assurance Technology Professionals, vol. 13, No. 4, pp. 16-21, Fall 2010 (Oct. 2010).

MaCaulay, T., "Upstream Intelligence: A New Layer of Cybersecurity", IAnewsletter, The Newsletter for Information Assurance Technology Professionals, vol. 13, No. 3, pp. 22-25, Summer 2010 (Jul. 2010).

MaCaulay, T., "Anatomy of Upstream Intelligence", IAnewsletter, The Newsletter for Information Assurance Technology Professionals, vol. 13, No. 3, pp. 26-31, Summer 2010 (Jul. 2010).

MaCaulay, T., "Business Models of Upstream Intelligence Management and Distribution", IAnewsletter, The Newsletter for Information Assurance Technology Professionals, vol. 13, No. 3, pp. 32-37, Summer 2010 (Jul. 2010).

MaCaulay, T., "Upstream Intelligence Use Cases", IAnewsletter, The Newsletter for Information Assurance Technology Professionals, vol. 14, No. 1, pp. 18-22, Winter 2011 (Jan. 2011).

Cisco Systems, Inc., "Cisco Security Intelligence Opeartions At-a-Glance", Apr. 2009, retrieved at http://www.cisco.com/E-Learning/quickstart/security/cdc_bulk/Additional_Resources/resources/CSIO_At-a-Glance.pdf, 3 pages.

Hewlett-Packard Development Company ,L.P., "Cisco 4200 Series IPS Product Analysis", Security Effectiveness Technical Brief, Nov. 2010, retrieved at http://www.ts.avnet.com/uk/vendors/hpnetworking/assets/cisco_product_analysis_tp_technical_brief, 7 pages.

MaCaulay, T., "Upstream Security and Intelligence Case Studies", IAnewsletter, The Newsletter for Information Assurance Technology Professionals, vol. 14, No. 1, pp. 30-33, Winter 2011 (Jan. 2011).

Fermilab Computing Division, "Network and Virtual Services", retrieved at http://cdorg.fnal.gov/nvs/architecture.php, May 17, 2012, 1 page.

CCNA—Internetworking, "Three-Layer Model", retrieved at http://ciscotests.org/ccna.php?part=1&page=7, May 17, 2012, 2 pages.

MaCauley, T., Bell, "Upstream security—stopping threats before they reach your network", Feb. 2010, 11 pages.

Wikipedia, "Evil bit", retrieved at http://en.wikipedia.org/wiki/Evil_bit, May 18, 2012, 1 page.

Derkeiler.com, RFC3514 for FreeBSD7, retrieved at http://unix.derkeiler.com/Mailing-Lists/FreeBSD/hackers/2008-04/msg00071.html, Jul. 21, 2011, 2 pages.

Cvs commit: src/sbin/ping ping.8 ping.c src/share/man/man4 inet.4 ip.4 src/sys/netinet in.h in_pcb.h ip.h ip_input.c ip_output.c ip_var.h src/usr.bin/netstat inet.c, dated Apr. 1, 2003, retrieved at http://lists.freebsd.org/pipermail/cvs-all/2003-April/001098.html, Jul. 21, 2011, 2 pages.

Cvs commit: src/sbin/ping ping.8 ping.c src/share/man/man4 inet.4 ip.4 src/sys/netinet in.h in_pcb.h ip.h ip_input.c ip_output.c ip_var.h src/usr.bin/netstat inet.c, dated Apr. 2, 2003, retrieved at http://lists.freebsd.org/pipermail/cvs-all/2003-April/001295.html, Jul. 21, 2011, 3 pages.

AT&T, "Cyber Security Services", Oct. 2001, 2 pages.

Informatica: The data Integration Company, "Collective Intelligence the Cyber Threat Deterrent", Mar. 2010, 14 pages.

\* cited by examiner

SYSTEM AND METHOD FOR GENERATING AND REFINING CYBER THREAT INTELLIGENCE DATA

CROSS-REFERENCE TO RELATED APPLICATION

This application claims the benefit of U.S. Provisional Patent Application Ser. No. 61/491,551, filed on May 31, 2011. The contents of the aforementioned application are incorporated by reference herein.

FIELD

The present invention relates generally to communication networks and, more particularly, to the generation and refinement of cyber threat intelligence data in order to identify potentially threatened assets.

BACKGROUND

Persistently changing and evolving threats and threat agents are driving up risks and elevating the need for new security capabilities to counter new risks. These are largely related to a new breed of malicious software (malware) designed and distributed for criminal profit, state sponsored offensive activities (spying) or ideological offensive purposes (terrorism and sabotage). This software manifests itself as the most successful form of crime and "violence" on the Internet: identity theft, credit card and banking fraud, spamming, phishing, and denial of service attacks.

It is known that malware increasingly passes undetected through firewalls, intrusion detection systems (IDS) and anti-virus (AV) systems. In some cases, these controls are less then 30% effective against known (previously identified) malware; in virtually all cases, vendors now include "generic" signatures for heuristic analysis (guessing) as a safeguard against the (previously unidentified) threats they cannot keep up with.

In the early 1990's to early 2000's, malware developers wrote viruses and worms that wreaked havoc by destroying data and systems, but it was more of a game. They claimed credit for bigger and more malicious infections and took pride in watching information technology (IT) managers scramble to stop the damage and fix systems, at huge expense. At that time, malware developers would share and publish exploit code. Now there is money to be made and strategic advantages to be gained through malware exploitation. Exploit code is shared less and the best code is not shared at all, rather it is guarded like an industrial secret. Prior to release, malware code is carefully and professionally tested against all known AV/IDS signatures using publicly available tools, and released into the wild in secret. Malware code and testing is more the work of highly educated and well-coordinated teams than of brilliant loners working from basements.

What is therefore needed is a real-time system for information and intelligence sharing, in order to identify threat agents and threatened assets on the Internet rather than to perpetuate the endless cycle of vulnerability patching and signature scanning.

SUMMARY

Cyber threat intelligence data refined by an intelligence headquarters (IHQ) in the carrier network (also referred to as "upstream intelligence") identifies threat agents and targeted assets, rather than malware and the vulnerabilities they exploit. To this end, and according to a first broad aspect, the present invention seeks to provide a method of refining cyber threat intelligence data, comprising: sending a first version of a threat list to a first cyber threat intelligence source and to a second cyber threat intelligence source; obtaining original first cyber threat intelligence data from the first cyber threat intelligence source, the original first cyber threat intelligence data being issued by the first cyber threat intelligence source based on the first version of the threat list; obtaining original second cyber threat intelligence data from the second cyber threat intelligence source, the original second cyber threat intelligence data being issued by the second cyber threat intelligence source also based on the first version of the threat list; creating a second version of the threat list based on at least the original first cyber threat intelligence data and the original second cyber threat intelligence data; sending the second version of the threat list to the first cyber threat intelligence source and to the second cyber threat intelligence source; obtaining new first cyber threat intelligence data from the first cyber threat intelligence source, the new first cyber threat intelligence data being issued by the first cyber threat intelligence source based on the second version of the threat list; obtaining new second cyber threat intelligence data from the second cyber threat intelligence source, the new second cyber threat intelligence data being issued by the second cyber threat intelligence source also based on the second version of the threat list; creating a third version of the threat list based on at least the new first cyber threat intelligence data and the new second cyber threat intelligence data.

According to another broad aspect, the present invention seek to provide a computer-readable storage medium storing computer-readable instructions which, when read by a computing device, cause the computing device to execute a process for refining cyber threat intelligence data that comprises: sending a first version of a threat list to a first cyber threat intelligence source and to a second cyber threat intelligence source; obtaining original first cyber threat intelligence data from the first cyber threat intelligence source, the original first cyber threat intelligence data being issued by the first cyber threat intelligence source based on the first version of the threat list; obtaining original second cyber threat intelligence data from the second cyber threat intelligence source, the original second cyber threat intelligence data being issued by the second cyber threat intelligence source also based on the first version of the threat list; creating a second version of the threat list based on at least the original first cyber threat intelligence data and the original second cyber threat intelligence data; sending the second version of the threat list to the first cyber threat intelligence source and to the second cyber threat intelligence source; obtaining new first cyber threat intelligence data from the first cyber threat intelligence source, the new first cyber threat intelligence data being issued by the first cyber threat intelligence source based on the second version of the threat list; obtaining new second cyber threat intelligence data from the second cyber threat intelligence source, the new second cyber threat intelligence data being issued by the second cyber threat intelligence source also based on the second version of the threat list; creating a third version of the threat list based on at least the new first cyber threat intelligence data and the new second cyber threat intelligence data.

According to another broad aspect, the present invention seek to provide a method of generating a cyber threat intelligence report, comprising: obtaining first cyber threat intelligence data from a first cyber threat intelligence source controlled by a carrier network operator; obtaining second cyber threat intelligence data from a second cyber threat intelligence source not controlled by the carrier network operator; generating a cyber threat intelligence report from at least the first and second cyber threat intelligence data; delivering the cyber threat intelligence report to at least one network element in or outside of the carrier network.

According to another broad aspect, the present invention seek to provide a computer-readable storage medium storing computer-readable instructions which, when read by a computing device, cause the computing device to execute a process for generating a cyber threat intelligence report that comprises: obtaining first cyber threat intelligence data from a first cyber threat intelligence source controlled by a carrier network operator; obtaining second cyber threat intelligence data from a second cyber threat intelligence source not controlled by the carrier network operator; generating a cyber threat intelligence report from at least the first and second cyber threat intelligence data; delivering the cyber threat intelligence report to at least one network element in or outside of the carrier network.

According to another broad aspect, the present invention seek to provide a method of generating a cyber threat intelligence report, comprising: obtaining first cyber threat intelligence data from a first cyber threat intelligence source controlled by a carrier network operator; obtaining second cyber threat intelligence data from a second cyber threat intelligence source controlled by the carrier network operator; combining the first and second cyber threat intelligence data to create a cyber threat intelligence report; delivering the cyber threat intelligence report to at least one network element in or outside of the carrier network.

According to another broad aspect, the present invention seek to provide a computer-readable storage medium storing computer-readable instructions which, when read by a computing device, cause the computing device to execute a process for generating a cyber threat intelligence report that comprises: obtaining first cyber threat intelligence data from a first cyber threat intelligence source controlled by a carrier network operator; obtaining second cyber threat intelligence data from a second cyber threat intelligence source controlled by the carrier network operator; combining the first and second cyber threat intelligence data to create a cyber threat intelligence report; delivering the cyber threat intelligence report to at least one network element in or outside of the carrier network.

BRIEF DESCRIPTION OF THE DRAWINGS

These and other features and aspects of the present invention will become apparent from consideration of the appended drawings, in which.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
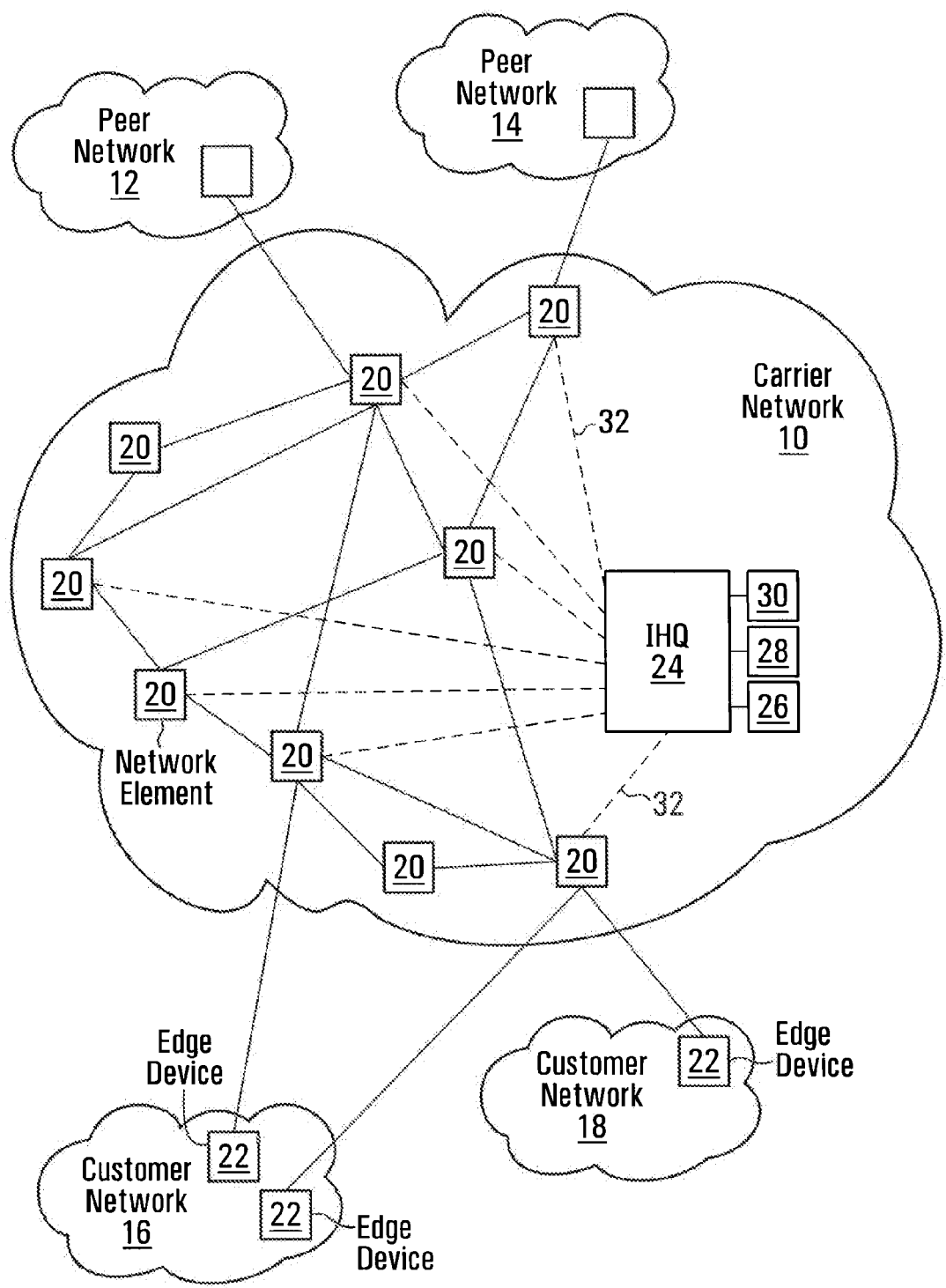
FIG. 1 is an architectural diagram showing network components involved in the collection and sharing of cyber threat intelligence data, in accordance with a non-limiting embodiment.

FIG. 1 shows an architectural network diagram, comprising a carrier network 10. The carrier network 10 is owned/operated by a carrier network operator such as a national or private telecommunications company. In the following, the terms "carrier network operator" and "carrier network" can be used interchangeably with the terms "service provider" and "service provider network", respectively. The carrier network 10 provides access to various peer networks 12, 14, which together form part of a global system of interconnected networks, collectively known as the Internet. The carrier network 10 connects various local customer networks 16, 18 to the Internet, typically for a fee. Non-limiting examples of customer networks 16, 18 include enterprise networks (e.g., managed by corporations, institutions, etc.), individual home networks (including those with multiple network elements and those with a single network element) and distributor/reseller networks. Although the drawing shows two customer networks 16, 18, it should be understood that there may be numerous customer networks that are serviced by the carrier network 10.

The carrier network operator may enter into a peering arrangement with the operator of each peer network 12, 14, and there may be hundreds of such peering arrangements for a single carrier network operator. Thus, although the drawing shows two peer networks 12, 14, it should be understood that there may be numerous peer networks connected to the carrier network 10. The peering arrangements establish the rules by which the carrier network 10 and the peer networks 12, 14 will exchange traffic, with the understanding that both the carrier network operator and the operators of the peer networks 12, 14 each stand to gain mutual benefit by allowing their networks to be accessed by the others' customers.

The carrier network 10 includes numerous interconnected network elements 20. The network elements 20 allow the establishment and management of packet-switched connections between devices reachable on the customer networks 16, 18 and either other devices reachable through a different customer network or devices reachable through the peer networks 12, 14. Examples of network elements that may help in fulfilling these functions generally include various types of routers, switches, gateways, bridges, servers, multiplexers, and the like. Non-limiting examples of specific types of network elements include web servers, proxy servers, mail servers, remote access servers, video distribution servers, digital subscriber line access multiplexers, core routers, edge routers, domain name service (DNS) servers, firewalls and the like. Other network elements can be used and will be known to those skilled in the art.

A given customer network 16, 18 connects to the carrier network 10 by one or more edge devices 22 in the given customer network 16, 18. A non-limiting example of an edge device 22 that may be suitable in some embodiments is an edge router or gateway.

An intelligence headquarters (IHQ) 24 in the carrier network 10 produces refined cyber threat intelligence data pertaining to particular instances of particular traffic attributes that are indicative of a threat. The traffic attributes being discussed here can be of various types, including IP addresses (both as source and as destination), autonomous system numbers (ASNs, both as source and as destination), domain names (both as source and as destination), classless inter-domain routing (CIDR) blocks (both as source and as destination), payload heuristics (e.g., URL strings), source and destination port, protocol, the traffic flow rate/volume (such as very high rates, or very low but periodic rates), and the time-of-day patterns (such as off-hours), to name a few non-limiting possibilities. The cyber threat intelligence data produced by IHQ 24 may indicate, from the perspective of a given customer network 16, 18, threats that arise from an external entity and also threats against internal assets (physical or informational (e.g., classified data, personal information, industrial control systems, business information like strategic plans or intellectual property)). The cyber threat intelligence data produced by IHQ 24 may also include indicators of threat severity.

According to one possible model, if a given customer network 16, 18 is interested in consuming cyber threat intelligence data produced by IHQ 24, the operator of the given customer network 16, 18 subscribes to a threat monitoring and/or assessment service offered by the carrier network operator. A fee may or may not be associated with this subscription. Other models will be apparent to those of skill in the art. In the illustrated example, refined cyber threat intelligence data (cyber threat intelligence data that is ready for consumption) may be delivered to the edge device(s) 22 of the customer network 16, 18. The edge device 22 may then apply the refined cyber threat intelligence data directly to traffic entering or exiting (or circulating within) the customer network 16, 18, or it may further distribute the refined cyber threat intelligence data to other devices in the customer network 16, 18. In another embodiment (not shown), certain strategically positioned network elements in the carrier network 10 are the recipients of the refined cyber threat intelligence data, and are tasked with manipulating the traffic as it traverses the carrier network 10. This results in the refined cyber threat intelligence being encoded into the traffic that is delivered to or from the customer networks 16, 18 or peer networks 12, 14.

To generate the refined cyber threat intelligence, IHQ 24 carries out a threat intelligence data refining process that involves communicating with a subset of the network elements 20 (hereinafter referred to as "sensors") that are equipped with monitoring capabilities. Examples of monitoring capabilities may include the capability to monitor traffic flows, DNS queries, emails, text messages, phone calls, peer-to-peer sessions and/or web accesses, to name a few non-limiting possibilities.

IHQ 24 can be implemented by one or more co-located computing devices in the carrier network 10. Alternatively, IHQ 24 may be distributed amongst multiple locations in the carrier network 10. In yet another embodiment, IHQ 24 may be implemented, at least in part, by an entity outside of the carrier network 10. In one embodiment, IHQ 24 can be implemented by a processing entity (such as a microprocessor) that is configured to read coded instructions from a storage medium 26. Acting on the coded instructions results in execution of the threat intelligence data refining process, which may include the storage of data in a memory/database 28, the extraction of data from a memory/database 28, the manipulation of data already contained in a memory/database 28, the transmission of a signal, the processing of a received signal and/or one or more other tangible effects.

IHQ 24 may be accessible to network security management personnel via a console 30. Alternatively, IHQ 24 may be accessible over a network (e.g., the Internet). In either case, IHQ 24 may be programmed (either on-site or remotely) to execute one or more of the functions disclosed herein. In particular, parameters used by IHQ 24 to execute the threat intelligence data refining process can be modified. Also, some security management personnel may assist with execution of one or more steps of the threat intelligence data refining process, either through the console 30 or remotely over a network such as the Internet.

Figure 2:
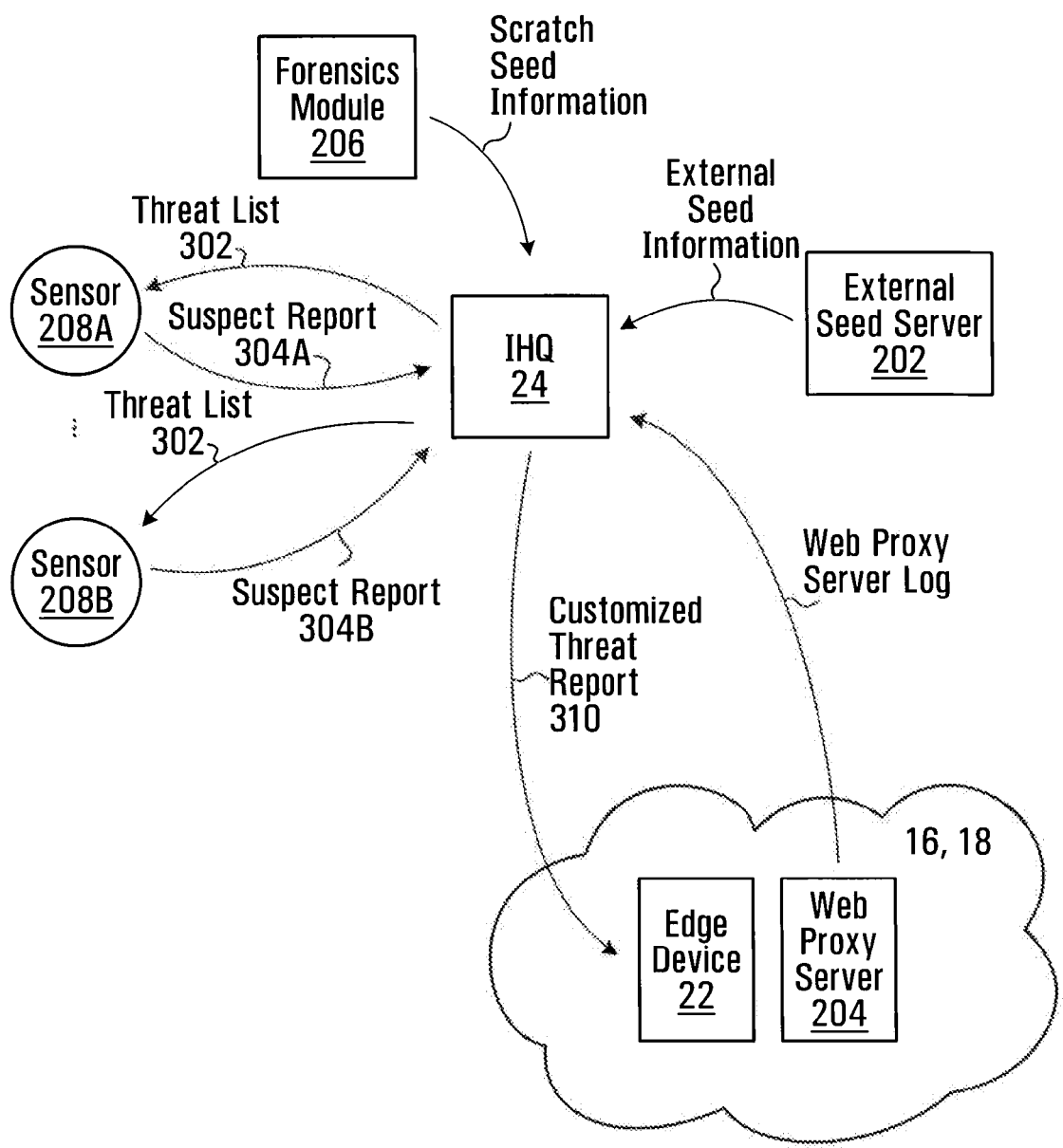
FIG. 2 shows a logical diagram in which an intelligence headquarters (IHQ) communicates cyber threat intelligence data with various network components, in accordance with a non-limiting embodiment.

With additional reference to FIG. 2, there is shown a logical network diagram, in which IHQ 24 communicates with various cyber threat intelligence sources. The cyber threat intelligence sources provide raw cyber threat intelligence data to IHQ 24. The cyber threat intelligence sources include external sources (i.e., sources from outside the carrier network 10) and internal sources (i.e., sources within the carrier network 10). Examples of external cyber threat intelligence sources include external seed sources 202 and web proxy servers 204. Examples of internal cyber threat intelligence sources include forensics modules 206 in the carrier network 10 and sensors 208A, 208B (i.e., those of the network elements 20 that have monitoring capabilities). Although the drawing shows two sensors 208A, 208B, it should be understood that in actual practice, there may be numerous sensors. Non-limiting examples of the various cyber threat intelligence sources are now described in some detail.

External Seed Sources

An example of raw cyber threat intelligence data that can provided by external seed sources 202 is external seed information. Each item of external seed information may relate to a particular instance of a particular traffic attribute, such as a list of IP addresses, ASNs, domain names, CIDR blocks and payload heuristics, to name a few non-limiting possibilities. The external seed information could come from a variety of sources, including, without limitation, open sources and closed sources. In some cases, open-source seed information is freely available on the Internet through groups with open memberships. Alternatively, the information may simply be posted to websites. Lists of suspected "bad" Internet protocol (IPs) addresses (such as spammers, distributed denial-of-service (DDOS) attackers, nefarious domain name system (DNS) servers, or web-hosting sites) are published by various security vendors, as well as unaffiliated/not-for-profit sites dedicated to security, such as the Spam and Open Relay Blocking System (SORBS) or SpamHaus. Open-source seed information can also include the signatures and profiles of known malware, available from a source like the U.S. Computer Emergency Readiness Team (US-CERT). The quality of open-source seed information is as diverse as the available suppliers. Nevertheless, a significant quantity of valuable information is available on an open-source basis.

On the other hand, closed-source seed information is not publicly available and is associated with information security operations, intelligence gathering, and relationships among carrier network operators/service providers (of which there are hundreds worldwide). These carrier network operators/service providers share intelligence about compromised devices and networks on a practical and symbiotic basis at the engineering level, even while they may be harsh competitors at the management level.

Customer complaints are another form of closed-source seed information; persons or businesses attempting to cope with degraded network service have a tendency to contact the carrier network operator/service provider because they may figure (erroneously) that the degradation they are experiencing is related to a network problem. Such support calls often reveal severely compromised machines, much to the surprise of their owners who are frequently running some form of reputable anti-virus or intrusion detection software.

Another specific example of closed-source seed information is security product vendor intelligence. In fact, many vendors of security products provide data (uch as logged event information) to their customer base, based on observations from within the customer base. The ability to extract intelligence from this data for applications not associated with the vendor's security product varies, and is usually tied to ownership of the security product. However, in some cases it may be possible to extract intelligence from the logged event information of the security product. For instance, the results of reputation look-ups on inbound or outbound IP addresses, networks, etc. may be visible in the event logs. Parsing the event logs and providing the source/destination and reputation information to IHQ is therefore rendered possible. Alternatively, some vendors may communicate data to their security products through cleartext network communications, in which case the desired intelligence can be extracted through network packet capture and processing. It should be noted that each security product vendor applies its own proprietary scoring of threat levels, and therefore the scores provided by security product vendors are not necessarily standardized in any manner. Therefore, the extraction and use of security product vendor intelligence may require that a "translation" system be included in IHQ which maps threat levels from one security product vendor to different but equivalent threat levels scores from another vendor, or to a normalized threat level that is understood by IHQ.

The aforementioned examples of external seed information can be obtained from numerous types of "communities". Examples include web, domain name system (DNS), network, peer-to-peer (P2P), messaging and anti-virus (AV)/ malware. These broad communities exist today, having evolved as a matter of commercial market opportunities (which have defined the vendors) and personal interests (which have defined the volunteers). Membership in these communities is neither restrictive nor prescribed; entities may be members or suppliers to several, though not usually all, communities. Each community possesses independent capabilities to generate its own intelligence, but many of the IPs, domains and ASNs identified by one community are identified in the others. Similarly, they all possess false positives or expired intelligence, which is detected and expunged at different rates.

It may be advantageous for the carrier network operator to be a member of multiple different collection networks involving the aforementioned communities, in order to obtain as much external seed information as possible, even if it appears duplicated. Reasons for extending the range of sources include sample richness, resiliency, and redundancy. Sample richness pertains to the fact that the larger the sample, the greater that chance that a given malicious IP, domain or ASN will enter the sample pool for assessment. Resiliency and redundancy improves the chances of obtaining relevant external seed information during the time when suppliers of such information are also under stress and prone to degradation. For example, if one source is disrupted or even compromised, the remaining sources can compensate through alternate data pathways.

Web Proxy Servers

An example of raw cyber threat intelligence data that can be provided by a web proxy server 204 in the customer network 16, 18 is a web proxy server log. Specifically, many large organizations implement web proxy servers for internal users accessing external resources on the World Wide Web ("the web"), as well as for other services like file transfer protocol (FTP). These proxy servers have a variety of useful security purposes, from managing traffic consumption internally to limiting the types and content of web pages that users access. Web proxy settings are generally part of the corporate browser configuration and read by any desktop/local software needing access to Internet resources, including malware. Therefore, the raw cyber threat intelligence data provided by web proxy logs can contribute to the generation of refined cyber threat intelligence data when cross-referenced with a list of IP addresses, domains and ASNs with which malware is known to communicate.

Forensics Modules

An example of raw cyber threat intelligence data that can be provided by a forensics module 206 in the carrier network 10 is scratch seed information. Specifically, the forensics module 206 detects a degraded device in the carrier network 10, and traces it to external sources. For example, the forensics module 206 can begin with a single device exposing an external malicious entity, which under observation at the enterprise level or carrier network operator level, exposes its relationships with other malicious or compromised entities. The network communication patterns and protocols of these entities are then closely observed for relatively simple criteria, such as outbound destination, port and protocols, and especially the timing and traffic characteristics. The scratch seed information therefore includes particular instances of particular traffic attributes.

Sensors

The sensors 208A, 208B are involved in an iterative feedback loop with IHQ 24. That is to say, the sensors 208A, 208B provide raw cyber threat intelligence to IHQ 24, receive refined cyber threat intelligence from IHQ 24, and produce more raw cyber threat intelligence data for processing by IHQ 24, and so on. One or more communication links 30 (see FIG. 1) can be established between IHQ and the sensors 208A, 208B. In a non-limiting embodiment, one or more of the communication links can be an intra-carrier network operator Internet Protocol (IP) link, namely a communication link that is established within the carrier network's domain using the Internet Protocol (IP). In another non-limiting embodiment, one or more of the communication links can be virtual private network (VPN) links. It is envisaged that a secure socket layer (SSL) over IP connection from IHQ 24 to a sensor management console can be established for performing analytics and sustaining the feedback loop among the various cyber threat intelligence sources.

Figure 3:
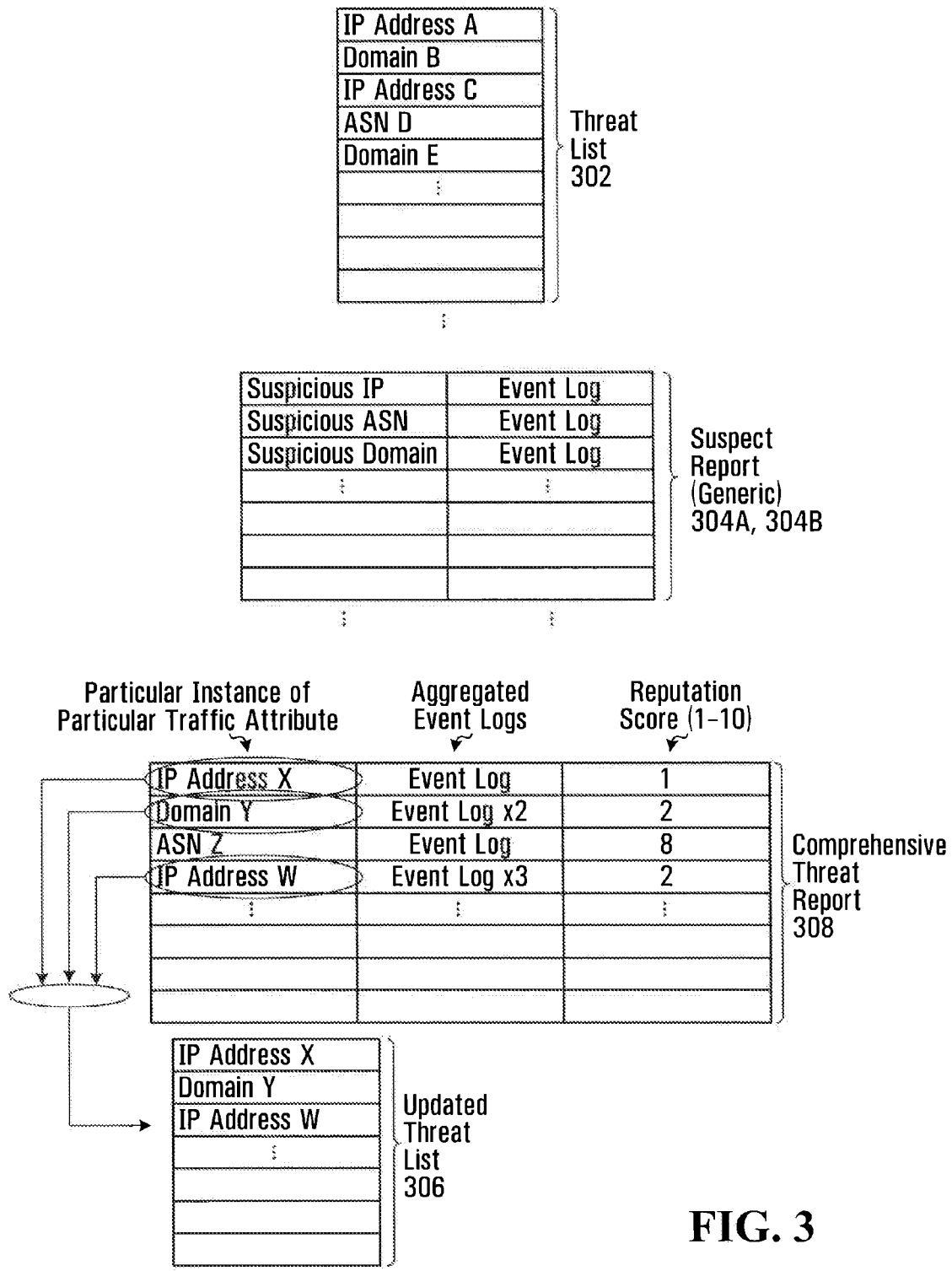
FIG. 3 shows various forms of cyber threat intelligence data at different stages of a threat intelligence data refining process performed by IHQ, in accordance with a non-limiting embodiment.

With additional reference to FIG. 3, the sensors 208A, 208B monitor traffic activity based on refined cyber threat intelligence data (e.g., a "threat list" 302) provided by IHQ 24 in order to produce raw cyber threat intelligence data (e.g., a respective "suspect report" 304A, 304B), which is provided back to IHQ 24 over the communication links 30. The "threat list" 302 can include a list of particular instances of particular traffic attributes that are indicative of a threat. In a non-limiting embodiment, the same threat list 302 may be provided to all sensors 208A, 208B.

For its part, the "suspect report" issued by a given sensor 208A, 208B includes information relating to particular instances of particular traffic attributes that are "suspicious", from the point of view of the given sensor 208A, 208B. According to one definition, which is by no means limiting, an instance of a particular attribute is considered by a given sensor to be "suspicious" if it is found to be potentially compromised or threatened (i.e., it may be indicative of a threat). It is noted that to confirm whether the instance of the particular attribute is indeed indicative of a threat, it is subjected to processing by the threat intelligence data refining process.

The information provided by a given sensor 208A, 208B and relating to a particular instance of a particular traffic attribute can range from a simple indication that the particular instance of the particular traffic attribute is suspicious, all the way to a variety of ancillary indicators (such as an event log) that depend on the type of traffic activity being monitored by the given sensor. It should be noted that some of the instances of traffic attributes appearing on the suspect report 304A, 304B from a given sensor 208A, 208B might not have appeared on the threat list 302, while some of the instances of traffic attributes appearing on the threat list 302 might not appear on the suspect report 304A, 304B from a given sensor 208A, 208B.

In accordance with a possible embodiment, a given sensor 208A, 208B in the carrier network 10 may be configured to monitor one or more from among many types of traffic activity. Only four (4) will be described but others will become apparent to those of skill in the art. These include (i) traffic flows; (ii) domain name server (DNS) queries; (iii) messaging (the transmission of emails, text messages and telephony); and (iv) peer-to-peer (P2P) sessions. Each of these types of traffic activity is now described in greater detail.

Traffic Flow Monitoring

A given sensor 208A, 208B can be part of a system for monitoring the flow of traffic through network junction points, both internally to the carrier network 10 and at borders with other providers (such as peer networks 12, 14 or customer networks 16, 18). The analysis of traffic flows (i.e., "traffic analysis") can show ambiguous devices talking to suspicious destinations, and potentially who those destinations are in turn speaking to as well.

In a specific non-limiting embodiment, the sensor 208A, 208B can implement a proprietary but widely supported protocol from Cisco Systems, San Jose, Calif., called NetFlow. NetFlow (and other similar protocols, such as Internet Protocol Flow Information Export—IPFIX), allows carrier network operators to maintain a picture of traffic flows and volumes, which are basic tools for managing network quality and assurance. This information is also useful for understanding the threats posed by entities using the carrier network 10 for illicit and malicious purposes. Basic information supported by NetFlow (and other similar protocols, such as IPFIX) can include: source IP address, destination IP address, source port, destination port, IP protocol, ingress interface to the carrier network 10, and some information about the type or quality of service associated with the traffic.

In another specific non-limiting embodiment, the sensor 208A, 208B can implement the Peakflow system, which is available from Arbor Networks, Chelmsford, Mass. The Peakflow system provides visibility into routing, IP flow, IPv6 and application-layer data.

To collect the relevant data, the sensor 208A, 208B receives the threat list 302 from IHQ 24, which identifies particular instances of particular traffic attributes (e.g., IP addresses, ASNs, domain names, CIDR blocks, payload heuristics, etc.) that are indicative of a threat. These particular instances of particular traffic attributes can be incorporated into a filter such that any communications that possess these attributes (i.e., are directed to or from the identified IP addresses, or match the identified payload heuristics, etc.) can be logged by the sensor 208A, 208B as an "event". The sensor 208A, 208B may reserve a section in memory for the purposes of recording the logged events, or the event log may be communicated to off-site storage.

The information collected by the sensor 208A, 208B based on the threat list is organized into the suspect report 304A, 304B. By way of example, an example suspect report 304, 304B that can be provided by a sensor 208A, 208B that is configured to monitor traffic flows can include all or a subset of the following information in the event log corresponding to a particular instance of a particular traffic attribute (not to be considered limiting): (i) destination address; (ii) destination port; (iii) protocol; (iv) payload heuristics; (v) time and date of traffic; (vi) number of observed sessions; (vii) number of observed packets; (viii) traffic rates DNS Query Monitoring A given sensor 208A, 208B can be part of a domain name service (DNS) infrastructure, which is one of the Internet's critical workhorses. The domain name service translates human-readable addresses (e.g., www.address.com) into machine-readable and -routable addresses (e.g., 123.255.255.255). If the domain name system were to fail, most or all IP-based communication would slow down or come to a stop. The DNS infrastructure in carrier networks is large, and supports millions of users and queries at a scale beyond most enterprises. The DNS infrastructure in the carrier network 10 includes a DNS server (not shown) that responds to queries made by any of the customer networks 16, 18.

The analysis of DNS data can provide valuable forms of intelligence, for instance: which devices have been compromised by malware, who is attempting to control the compromised devices, who is launching attacks against specific assets, and where are they maliciously redirecting users (such as the identity of a compromised server).

To collect the relevant data, the sensor 208A, 208B receives the threat list 302 from IHQ 24, which identifies particular instances of particular traffic attributes (e.g., particular IP addresses, ASNs, domain names, CIDR blocks, etc.) that are indicative of a threat. These particular instances of particular traffic attributes can be incorporated into a filter on a DNS server that processes DNS queries. Each request to look up a particular IP address or domain name identified as a potential threat (i.e., on threat list 302) can be logged by the sensor 208A, 208B as an "event". The sensor 208A, 208B may reserve a section in memory for the purposes of recording the logged events, or the event log may be communicated to off-site storage.

The information collected by the sensor 208A, 208B based on the threat list 302 is organized into the suspect report 304A, 304B. By way of example, an example suspect report 304A, 304B that can be provided by a sensor 208A, 208B that is configured to monitor DNS queries can include all or a subset of the following information in the event log corresponding to a particular instance of a particular traffic attribute (not to be considered limiting): (i) time and date of request; (ii) source port; (iii) requested domain; (iv) requester source IP (which, for an enterprise, might be a NATing gateway); (v) IP addresses response provided by the DNS server (i.e., where did it send the requester?).

Message Monitoring

A given sensor 208A, 208B can be part of a messaging infrastructure that is configured to monitor the transmission of emails, text messages, instant messages and telephony. In particular, it will be appreciated that the messaging infrastructure can support a variety of filters. Understanding the nature of these filters allows the reports they generate to be applied to proactive threat and risk management. One distinction among different filters involves "inbound" and "outbound" message filtering. Inbound filtering relates to messages arriving at a messaging aggregation point from domains external to the destination domain, whereas outbound filtering relates to messages from an organization destined for external domains. Inbound filtering metrics indicate threats to the organization, enterprise, or user base. In contrast, outbound filter reports are of particular interest because they can indicate compromised internal devices, which often manifest their degraded state through the illicit e-mail messages they start producing.

To collect the relevant data, the sensor 208A, 208B receives the threat list from IHQ 24, which identifies particular instances of particular traffic attributes (e.g., particular IP addresses, ASNs, domain names, CIDR blocks, payload heuristics, etc.) that are indicative of a threat. These particular instances of particular traffic attributes can be incorporated into a filter on a messaging server. Thus, in addition to filtering incoming and outgoing email messages for illicit content such as viruses, phishing content, malware and bulk-mailings/spam (which may be against the service-usage policy), the messaging server also detects when messages originate from (or are destined to or contain) a particular IP address, domain name, payload heuristics, etc. identified as a potential threat (i.e., on threat list 302). A single illicit message from a given end-point device may be enough to indicate that the device has been compromised. Each illicit message can be logged by the sensor 208A, 208B as an "event". The sensor 208A, 208B may reserve a section in memory for the purposes of recording logged events, or the event log may be communicated to off-site storage.

The information collected by the sensor based 208A, 208B on the threat list 302 is organized into the suspect report 304A, 304B. By way of example, an example suspect report 304A, 3046 that can be provided by a sensor 208A, 208B that is configured to monitor the transmission of messages can include all or a subset of the following information in the event log corresponding to a particular instance of a particular traffic attribute (not to be considered limiting): (i) SMTP header information (ii) time and date of message processing; (iii) source IP of sender (which might be a NATing gateway); (iv) payload information.

Peer-to-Peer (P2P) Session Monitoring

A given sensor 208A, 208B can be part of a traffic shaping infrastructure that is configured to monitor and control such phenomena as peer-to-peer (P2P) sessions among users. The traffic shaping infrastructure is used to manage the potentially huge traffic volumes associated with the activities of P2P systems that threaten the overall network.

Traffic shaping analysis involves real-time inspection of Internet traffic streams looking for telltale signs of P2P applications such as Kazaa, eMule, bitTorrent, and a range of similar tools. These applications distinguish themselves not just by large bandwidth consumption, but also by the ports and protocols they use, the format of the payload, and the P2P coordination server addresses they communicate with. Accordingly, the carrier network operator's traffic shaping infrastructure can also function as a detection mechanism—monitoring and issuing alerts when P2P sessions are initiated from within a specific domain, gateway or IP address. It should be appreciated that since command-and-control information requires only a small amount of data, even a small amount of P2P traffic from any end-point device (not necessarily one specified by the threat list) may be enough to indicate that the device may have been compromised or is possibly engaged in illicit activity such as copyright violations.

To collect the relevant data, the sensor 208A, 208B receives the threat list 302 from IHQ 24, which identifies particular instances of particular traffic attributes (e.g., particular IP addresses, ASNs, domain names, CIDR blocks, payload heuristics, etc.) that are indicative of a threat. These particular instances of particular traffic attributes can be incorporated into a filter used by the traffic shaping infrastructure such that any P2P communications that possess these attributes (i.e., are directed to or from (or contain) a particular IP address, domain name, payload heuristics, etc. identified as a potential threat (i.e., on threat list 302)) can be logged by the sensor 208A, 208B as an "event". The sensor 208A, 208B may reserve a section in memory for the purposes of recording logged events, or the event log may be communicated to off-site storage.

The information collected by the sensor 208A, 208B based on the threat list 302 is organized into the suspect report 304A, 304B. By way of example, an example suspect report 304A, 304B that can be provided by a sensor 208A, 208B that is configured to monitor peer-to-peer sessions can include the following information in the event log corresponding to a particular instance of a particular traffic attribute (not to be considered limiting): (i) time and date; (ii) destination port; (iii) protocol and application; (iv) destination information.

Figure 4:
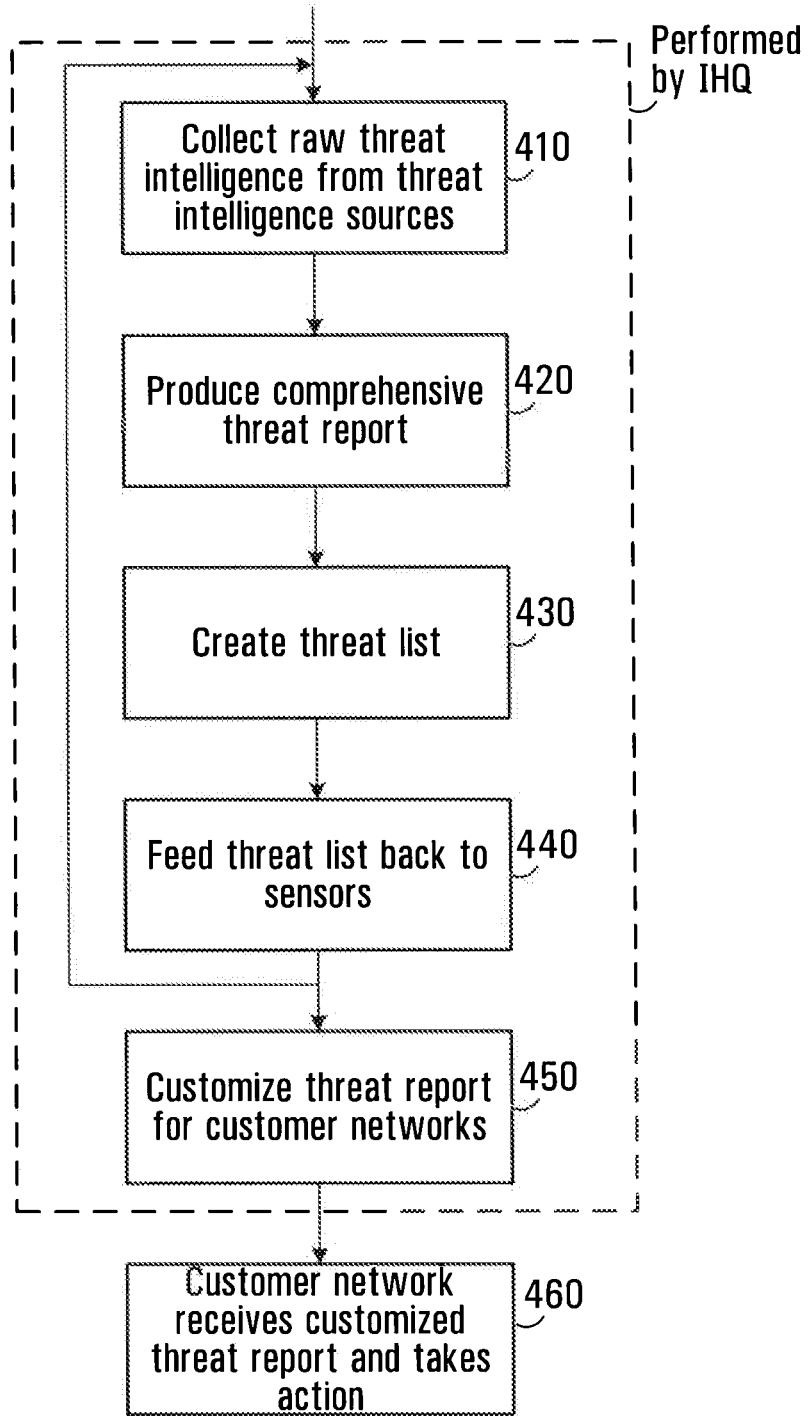
FIG. 4 shows steps in the threat intelligence data refining process, as performed by IHQ, in accordance with a non-limiting embodiment.

With continued reference to FIG. 3, it will be seen that an intelligence set feeds into the sensors 208A, 208B (i.e., the threat list 302) and a larger intelligence set comes out (i.e., the suspect reports 304A, 304B). In accordance with an embodiment of the present invention, this larger intelligence set is fed to and processed by IHQ 24, and is fed back into the sensors 208A, 208B in the form of an updated threat list 306. Generation of the continuously updated threat list 306 from the suspect reports 304A, 304B can be described as the result of a cyber threat intelligence data refining process, now described in further detail with additional reference to the flowchart in FIG. 4. It should be appreciated that the described steps do not need to be performed in the listed order.

Step 410

IHQ 24 collects raw cyber threat intelligence data from the cyber threat intelligence sources. This can include receiving external seed information from the external seed sources 202, receiving web proxy server log(s) from the web proxy server(s) 204, receiving scratch seed information from the forensics module 206 and receiving suspect reports 304A, 304B from the various sensors 208A, 208B (which, it is recalled, may include network elements that perform one or more of traffic flow monitoring, DNS query monitoring, message monitoring and P2P monitoring (as described above), as well as possibly other types of monitoring).

Step 420

IHQ 24 produces a comprehensive threat report 308 based on the raw cyber threat intelligence collected at step 410. In a non-limiting embodiment, and with reference to FIG. 3, the comprehensive threat report 308 may be visualized as a table of records, each record having a plurality of fields.

A first field of a given record can include a particular instance of a particular traffic attribute (e.g., an IP address, ASN, domain name, CIDR block, payload heuristic, etc.).

A second field of the same record can include an aggregation of all logged events pertaining to the particular instance of the particular attribute identified in the first field, as reported by the various cyber threat intelligence sources.

For example, it may happen that an IP address has threat indicators logged by more than one and possibly all sources; for instance, for a given source (vicitim) IP address, there may be logged events associated with DNS query on a known bad, destination domain and the associated IP address. The same device may then be logged establishing a network session with the known bad IP address by the traffic flow sensors, and subsequently detected/logged establishing P2P command and control sessions and eventually logged by the messaging infrastructure as it attempts to bulk-send spam messages.

A third field of the same record can include a "reputation score", obtained by processing the raw cyber threat intelligence collected/obtained at step 410. Previous versions of the comprehensive threat report can also be factored into the analysis. It is noted that a carrier network operator is better positioned than an equipment vendor to combine suspect reports from multiple types of traffic activity sensors, because the various types of sensors are all within the carrier network operator's control. In particular, solutions from security product vendors (e.g., McAfee, Symantec, Cisco, etc.) all rely on equipment owned (and usually managed) by others. Therefore the intelligence collection infrastructure is out of their control, as are the local networks, administrators and the general environment. This means that any information gathered by a security product vendor is susceptible to the injection of mis-information and corruption. On the other hand, cyber threat intelligence data from a carrier network operator, as has been discussed herein, is derived from infrastructure owned by the carrier network operator and under its control. Therefore the fidelity/integrity of the collected and refined intelligence can be expected to be higher.

According to one model, which is by no means limiting, the reputation score for a particular instance of a particular traffic attribute reflects the extent to which IHQ 24 considers that traffic characterized by the particular instance of the particular traffic attribute is compromised. Thus, a lower reputation score for a particular instance of a particular traffic attribute could indicate that IHQ 24 considers that traffic characterized by the particular instance of the particular traffic attribute is deemed to be highly suspicious. Conversely, traffic characterized by a particular instance of a particular traffic attribute that is deemed by IHQ 24 to be trustworthy (or at least not suspicious) will result in a higher reputation score being assigned to the particular instance of the particular traffic attribute.

The reputation score of a particular instance of a particular traffic attribute (e.g., a specific IP address, ASN, domain, etc.) can be derived from the raw cyber threat intelligence.

For example, consider a suspect report 304A, 304B received from a sensor 208A, 208B that performs traffic flow monitoring. Depending on the nature of the devices participating in a logged event (e.g., known botnet controller, spam engine, malware drop site, etc.) and also depending on the direction of the traffic flow, this may influence the degree to which IHQ 24 considers the logged event a threat. For instance, the detection of command-and-control traffic (identified by destination, port and protocol and possibly payload heuristics) towards a destination known to be a botnet controller is a serious event and represents a serious security risk. IHQ 24 may therefore assign a low reputation score to the IP address associated with that destination. Conversely, email communications flow directed to a device or organization from a known spam engine may represent a lower risk, but can serve as a useful indicator of the degree to which an organization and its assets are being targeted (also referred to as "threat-to" information). In this case, IHQ 24 may set a somewhat higher reputation score for the IP address associated with that device or organization.

In another example, consider a suspect report 304A, 304B received from a sensor 208A, 208B that performs DNS query monitoring. The logged event information can provide IHQ 24 with intelligence about compromised devices potentially attempting to establish automated command-and-control sessions without the user's/owner's knowledge. For example, in some forms of malware, a DNS name is encoded as the "call-home" command-and-control address once a device has been compromised. Using a DNS name rather than an IP address provides the botmaster (controller of the malware) with the ability to change command-and-control servers to avoid detection and for redundancy. However, if a DNS server is configured to report when a DNS name known to be used for command-and-control operations is queried, this allows the carrier network operator to commence response operations earlier than would otherwise be possible. Specifically, in addition to the command-and-control addresses itself, the logged event information collected by IHQ 24 may reveal other useful information, such as the IP address of the victim, the machine's operating system, the time the malware was installed, the variant of malware, and so on. IHQ 24 can set a lower reputation score for the IP address of the victim. Alternatively or in addition, DNS lookup statistics can reveal incongruous matches between IP addresses and domain names, or where a legitimate website has its users redirected to malicious servers masquerading as a legitimate site (an attack form known as 'pharming') in an effort to steal identity information and/or infect devices.

In a further example, consider a suspect report 304A, 304B received from a sensor 208A, 208B that performs message monitoring. The logged event information reported by the sensor can be valuable to IHQ 24 for a number of reasons. For example, inbound messages sent to protected domains can provide information about targeted attacks on branded assets and help identify machines that may have been compromised as sending sources. Filtered outbound messages may indicate that an internal device has been compromised and is attempting to use preconfigured messaging services for illicit purposes. The IP address of this internal device can be assigned a low reputation score.

In yet another example, consider a suspect report 304A, 304B received from a sensor 208A, 208B that performs peer-to-peer session monitoring. The logged event information reported by the sensor can be valuable to IHQ 24 for a number of reasons. For example, it has been observed that P2P protocols are frequently used for command-and-control signaling by malware and botnets. Also, many P2P clients are embedded with malware, which will support file sharing according to user expectations, but will also index and surreptitiously expose everything on the host computer and any available network drives. In this way, personal or corporate information residing on the system or local network will become exposed to the P2P network. In fact, upon analyzing P2P search strings cascading through the file sharing networks, one can expect to find evidence of queries related to espionage and identity theft. Therefore, the aforementioned logged event information related to P2P sessions can be of great use in threat assessment and mitigation. Thus, in an example, IHQ 24 may assign a low reputation score to any IP address found to be involved in a P2P session abiding by a certain protocol.

In addition, the reputation score of a particular instance of a particular traffic attribute (e.g., a specific IP address, ASN, domain, etc.) can be impacted by a number of additional factors. These include:

the number of cyber threat intelligence sources that have revealed the particular instance of the particular traffic attribute as a potential threat. Specifically, a greater number of suspect reports or seed sources on which the particular instance of the particular traffic attribute appears can have a lowering effect on the reputation score;

the origin of the raw cyber threat intelligence (external versus internal);

the nature of the seed information. For example, open source seed information could be given a lesser weight, whereas closed source seed information could be attributed a greater weight. In another embodiment, scratch source seed information may be given the greatest weight. In still another embodiment, seed information from law enforcement can be given the maximum weight.

the number of logged events pertaining to the particular instance of the particular traffic attribute. Specifically, a greater number of logged events pertaining to the particular instance of the particular traffic attribute can have a lowering effect on the reputation score;

the types of monitoring performed by the sensors 208A, 208B that have revealed the particular instance of the particular traffic attribute as a potential threat. Specifically, discovering that a specific IP address has been revealed by a peer-to-peer, monitoring sensor can have a lowering effect on the reputation score;

the amount of time elapsed since the particular instance of the particular traffic attribute last appeared among the raw cyber threat intelligence. In this sense, the previous version of the comprehensive threat report is consulted and a "decay factor" is applied in order to reflect the fact that reputation score of an IP address, ASN or domain improves (i.e., rises) as more time passes since the occurrence of a logged event. Decay factors may vary by threat sensor type (e.g., peer-to-peer monitoring sensors may be given the highest rate of decay, with traffic flow monitoring sensors being given the lowest rate of decay due to, for example, Botnet beaconing). The decay factor can be dynamic, meaning that the rate of decay can accelerate or decelerate as time passes;

It should be appreciated that the various weights, decay factors and reputation score adjustments discussed above are configurable, and can be adapted to suit operational requirements. Configuration can be manual or automatic, and can occur via the console 30 or the Internet, to name two non-limiting possibilities.

Step 430

Refined cyber threat intelligence data is extracted from the comprehensive threat report 308. An example of refined cyber threat intelligence data is the updated threat list 306. The updated threat list 306 can be created from the comprehensive threat report 308 in numerous ways. In one specific non-limiting example, IHQ 24 can identify particular instances of particular traffic attributes having a reputation score lower than a certain threshold value, and to group the identified instances of traffic attributes into the threat list. For example, when the reputation scores range from 1 to 10, one can conceive of a threshold value, such as 2 or 3. Any instances of traffic attributes for which the reputation score is below this threshold could be considered severe threats and would make their way onto the updated threat list 306. Other ways of producing the updated threat list 306 from the comprehensive threat report 308 will be apparent to those of skill in the art.

For example, it is possible that IP addresses, domain, ASNs and CIDR blocks appear automatically on threat list due to overt, malicious activity and are assigned a low (bad) reputation score merely by virtue of being in the threat report 308 rather than according to reputation logic. For instance, a massive DDOS attack is observed from many IPs inside a specific ASN. These IPs especially, and perhaps the entire ASN, may be automatically added to the threat list 308 as a matter of necessary, summary judgment to preserve the integrity of the network. The evidence associated with these IPs may then be entered subsequently into the threat list 306 to manage the appropriate decay and rehabilitation. Still other ways of producing the updated threat list 306 from the comprehensive threat report 308 will be apparent to those of skill in the art.

Step 440

The updated 306 threat list created at step 430 is used as the threat list (previously numbered 302) that is fed back to the sensors 208A, 208B. In turn, the sensors 208A, 208B produce updated, "richer" suspect reports 304A, 304B, and so on. This next generation of suspect reports is considered richer because it may include certain instances of traffic attributes (e.g., particular IP addresses, ASNs, domain names, CIDR blocks, payload heuristics, etc.) that were not included in previous generations. A few examples may help illustrate this point.

In one example, IHQ 24 obtains, from the suspect report 304A, 304B of a sensor 208A, 208B that performs DNS query monitoring, logged security event information about specific end-point devices that were found to be looking up suspicious domain names. As per operation of the threat intelligence data refining process, the IP addresses of these end-point devices now appear on the updated threat list 306, which is then fed to the sensors 208A, 208B that perform traffic flow monitoring. This allows the sensors 208A, 208B that perform traffic flow monitoring to discover attempts to communicate with secondary command-and-control IP addresses that had not been previously identified. In this manner, new intelligence is generated about suspicious IP addresses/networks, based on the communications patterns from compromised devices discovered through the compound effect of DNS query monitoring and traffic flow monitoring.

In another example, IHQ 24 obtains, from the suspect report 304A, 304B of a sensor 208A, 208B that performs message monitoring, logged security event information about specific end-point devices that were found to be sending illicit messages. As per operation of the threat intelligence data refining process, the IP addresses of these end-point devices now appear on the updated threat list 306, which is then fed to sensors 208A, 208B that perform traffic flow monitoring. This allows the sensors 208A, 208B that perform traffic flow monitoring to discover attempts to communicate with secondary command-and-control IP addresses that had not been previously identified. In this manner, new intelligence is generated about suspicious IP addresses/networks, based on the communications patterns from compromised devices discovered through the compound effect of message monitoring and traffic flow monitoring.

Similarly, if a device is found to be propagating phishing attacks, the domain names coded with the messages (e.g., fake banking sites) will appear on the updated threat list fed to the sensors 208A, 208B that perform DNS query monitoring. This results in the potential discovery of additional suspicious IP addresses/networks, based on the communications patterns from compromised devices discovered through the compound effect of message monitoring and DNS query monitoring.

In yet another example, IHQ 24 obtains, from the suspect report 304A, 304B of a sensor 208A, 208B that performs P2P monitoring, logged security event information about specific end-point devices that were found to be engaging in P2P communications. As per operation of the threat intelligence data refining process, the IP addresses of these end-point devices now appear on the updated threat list 306, which is then fed to sensors 208A, 208B that perform traffic flow monitoring. This allows the sensors 208A, 208B that perform traffic flow monitoring to discover attempts to communicate with secondary command-and-control IP addresses that had not been previously identified. In this manner, new intelligence is generated about suspicious IP addresses/networks, based on the communications patterns from compromised devices discovered through the compound effect of P2P monitoring and traffic flow monitoring.

Similarly, the domain names associated with the destination IP addresses of P2P communications (as determined through reverse DNS lookups) can be made to appear on the updated threat list 306 fed to the sensors 208A, 208B that perform DNS query monitoring and message monitoring. This results in the potential discovery of additional suspicious IP addresses/networks, based on the communications patterns from compromised devices discovered through the compound effect of P2P monitoring and message monitoring and/or DNS query monitoring.

It should be appreciated that although the above iterative process of updating the threat list 302, 306 may continue indefinitely, the size of the threat list 302, 306 would not necessarily grow indefinitely. This is because the number of compromised devices is not infinite.

In fact, certain instances of traffic attributes may disappear from the threat list when they have been "rehabilitated". Thus, owners of compromised devices who become aware of a compromise fix the problem will not be unduly penalized, as would be otherwise occur with industry standard "black lists" that do not benefit from the continual refinement of cyber threat intelligence as described herein. According to the iterative process of generating the threat list 302, 306 described herein, the reputation score of a given instance of a particular traffic attribute may rise beyond the threshold, possibly causing it to be omitted from a subsequent version of the threat list 302, 306.

As such, compromised, illicit and malicious devices and networks will be "born" and "die" in a lifecycle that becomes observable (i.e., by observing changes in the threat list 302, 306). "Born" represents the point in time that the device or network is observably compromised (or put into illicit operations by its owner). "Die" represents the point in time where the compromised/illicit device or network is cleaned and repatriated by its owner, or is taken off line permanently. In between these points in time is the period where illicit activity is occurring—possibly unbeknownst to its owner—and the reputation score of the device or network is changing, typically becoming worse but potentially becoming better as the device or network is incrementally healed. For example, the owner may apply anti-spam protection or the carrier network operator can apply upstream mitigations (e.g., the carrier network operator may allow the device to send and receive legitimate web traffic on port 80, but filter out DDOS traffic on higher ports or DDOS traffic on the same port 80).

Figure 5A:
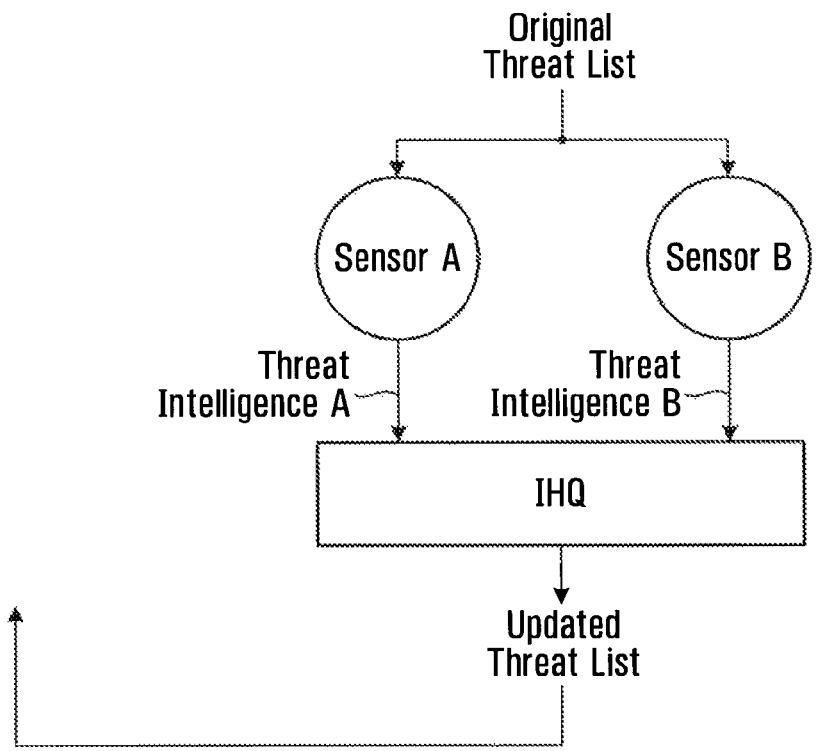
FIGS. 5A and 5B show interaction between IHQ and a plurality of sensors in the carrier network during the threat intelligence data refining process.
Figure 5B:
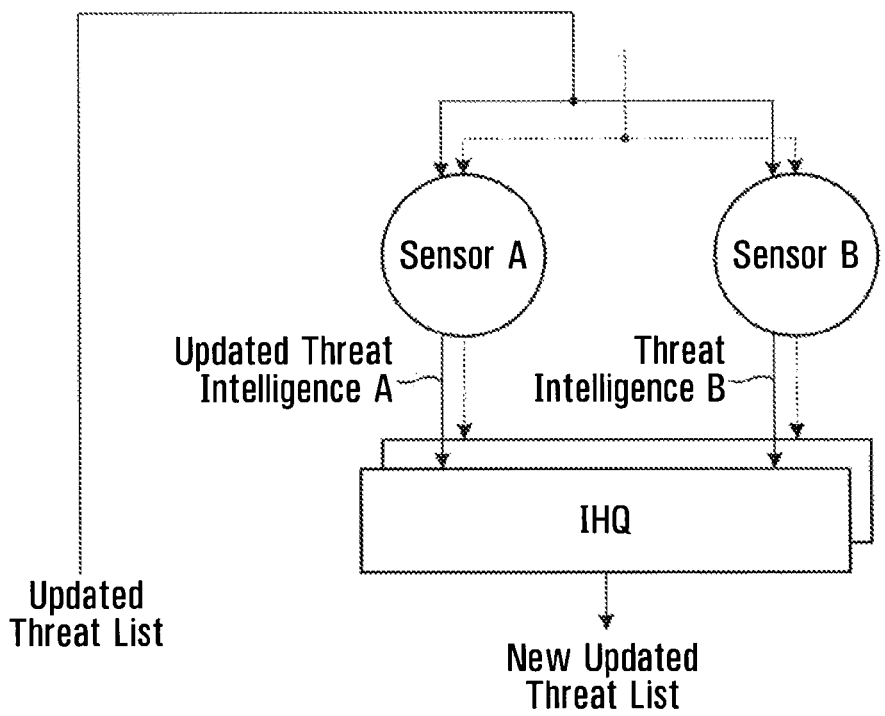

It may be illustrative to describe the iterative creation of refined cyber threat intelligence data more generally, such as with reference to FIGS. 5A and 5B. Specifically, as shown in FIG. 5A, a first version of the threat list is sent to a first cyber threat intelligence source and to a second cyber threat intelligence source (e.g., sensors A and B). Raw cyber threat intelligence data A and B is obtained from the first and second cyber threat intelligence sources, respectively. IHQ then creates an updated threat list based on at least the raw cyber threat intelligence data A and B. The updated threat list may contain new or omitted instances of particular traffic attributes, relative to the threat list. This means that feeding this (refined) information back into the cyber threat intelligence sources could reveal new intelligence.

Indeed, as shown in FIG. 5B, the updated threat list is fed back to the first and second threat intelligence sources (e.g., sensors A and B), which generate updated raw cyber threat intelligence A and B. IHQ then generates a new updated threat list based on at least the updated raw cyber threat intelligence A and B, and so on. This can reveal new cyber threats that were previously unknown, or it may reveal that previous cyber threats have been rehabilitated. Therefore, each new updated threat list begets new raw cyber threat intelligence data, and so on.

Step 450

The comprehensive threat report 308 can be customized, depending on the audience for which it is intended (e.g., the customer network). A customized threat report 310 is then provided to each customer network 16, 18 having subscribed to the carrier network operator's threat assessment service. In other cases, the delivery of threat information (e.g., in the form of a customized threat report 310) could be adopted by a current or future communications protocol standard (e.g., IPV6, to name a non-limiting example), with the option of consuming it resting with the enterprise customer.

The carrier network operator can take into consideration the competitive nature of individual customer networks 16, 18 when producing the customized threat report 310 from the comprehensive threat report 308. For example, the customized threat report 310 can include detailed information (e.g., event logs) about the devices in the customer network 16, 18, yet only general information (e.g., IP addresses only) about the devices in a competitor's network.

A customized threat report 310 can also be designed to expose malicious activity from different geographic regions around the world, by type of device or any other technical profile (time, date, force and velocity, duration, etc.). This information can also be aggregated into comparative dashboards customized by industrial sector, allowing managers to compare the degree of measureable threat activity against their assets versus the median or norm for the industry as a whole, or across all industry or even within the entire carrier sample set (which may be national in its coverage).

Step 460

Upon receipt of the customized threat report 310, the customer network 16, 18 may take a variety of actions.

Consider the non-limiting case of a gateway in the customer network 16, 18 that supports hundreds or thousands of end-point devices behind just a few IP addresses. In a specific but non-limiting example, DNS requests for domains on the threat list 302 may have been logged by one or more sensors 208A, 208B with precise time, source port and domain request information. This event information can be provided as part of the customized threat report 310 delivered to the customer network 16, 18. At its end, the customer network 16, 18 correlates the received event information with event information from the firewalls within its own gateway to determine which internal end-point devices made the DNS requests to the domains on the threat list 302.

In another specific but non-limiting example, messages containing viruses, malware, phishing and spam may have been logged by one or more sensors 208A, 208B with precise SMTP header information. This event information can be provided as part of the customized threat report 310 delivered to the customer network 16, 18. At its end, the customer network 16, 18 correlates the received event information with event information from its own messaging servers to determine which internal end-point devices sent (or received) messages containing viruses, malware, phishing or spam.

In a further specific but non-limiting example, observed P2P traffic may have been logged by one or more sensors 208A, 208B with precise time, port, protocol and destination information. This event information can be provided as part of the customized threat report 310 delivered to the customer network 16, 18. At its end, the customer network 16, 18 correlates the received event information with event information from its own firewalls and other security proxy servers to determine which internal end-point devices were involved in sending or receiving P2P traffic.

Other possible actions will become apparent to those of skill in the art.

As such, the threat intelligence data refining process performed by IHQ 24 allows the potentially real-time identification of zero-day threats and newly compromised devices. A powerful tool thus becomes available to those seeking to protect not only online assets, but also the very networks that support them.

Those skilled in the art will appreciate that the above description has focused on implementation of threat assessment in a carrier network merely for convenience. If needed, threat assessment in accordance with the principles of the present invention can be performed in other types of networks, including mobile networks and wide area/enterprise networks.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

Those skilled in the art will appreciate that in some embodiments, IHQ 24 and/or other illustrated elements may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, IHQ 24 and/or other illustrated elements may be implemented using pre-programmed hardware or firmware elements (e.g., application specific integrated circuits (ASICs), electrically erasable programmable read-only memories (EEPROMs), flash memory, etc.), or other related components.

The invention claimed is:

1. A method of refining cyber threat intelligence data, performed by network equipment in a carrier network controlled by a carrier network operator, comprising:
    sending a first version of a threat list to a first cyber threat intelligence source and to a second cyber threat intelligence source;
    obtaining original first cyber threat intelligence data from the first cyber threat intelligence source, the original first cyber threat intelligence data being issued by the first cyber threat intelligence source based on the first version of the threat list, wherein the original first cyber threat intelligence data includes an original first set of instances of traffic attributes deemed by the first cyber threat intelligence source to be suspicious and an original first event log relating to communications characterized by the original first set of instances of traffic attributes deemed by the first cyber threat intelligence source to be suspicious;
    obtaining original second cyber threat intelligence data from the second cyber threat intelligence source, the original second cyber threat intelligence data being issued by the second cyber threat intelligence source also based on the first version of the threat list, wherein the original second cyber threat intelligence data includes an original second set of instances of traffic attributes deemed by the second cyber threat intelligence source to be suspicious and an original second event log relating to communications characterized by the original second set of instances of traffic attributes deemed by the second cyber threat intelligence source to be suspicious;
    determining (i) an original plurality of instances of traffic attributes from the original first and second sets of instances of traffic attributes and (ii) a reputation score for each instance in the original plurality of instances of traffic attributes, the reputation score for each instance in the original plurality of instances of traffic attributes being determined based on factors including at least:
        the instances of traffic attributes in the original first and second sets of instances of traffic attributes;
        the communications logged in the original first and second event logs;
        an origin of the original first cyber threat intelligence data which originates either internal or external to the carrier network and an origin of the original second cyber threat intelligence data which originates either internal or external to the carrier network;
    creating a second version of the threat list including at least the traffic attributes from the original plurality of instances of traffic attributes with a reputation score below a predetermined threshold reputation score;
    sending the second version of the threat list to the first cyber threat intelligence source and to the second cyber threat intelligence source;
    obtaining new first cyber threat intelligence data from the first cyber threat intelligence source, the new first cyber threat intelligence data being issued by the first cyber threat intelligence source based on the second version of the threat list, wherein the new first cyber threat intelligence data includes a new first set of instances of traffic attributes deemed by the first cyber threat intelligence source to be suspicious and a new first event log relating to communications characterized by the new set of instances of traffic attributes deemed by the first cyber threat intelligence source to be suspicious;
    obtaining new second cyber threat intelligence data from the second cyber threat intelligence source, the new second cyber threat intelligence data being issued by the second cyber threat intelligence source also based on the second version of the threat list, wherein the new second cyber threat intelligence data includes a new second set of instances of traffic attributes deemed by the second cyber threat intelligence source to be suspicious and a new second event log relating to communications characterized by the new set of instances of traffic attributes deemed by the second cyber threat intelligence source to be suspicious;

determining (i) a new plurality of instances of traffic attributes from the new first and second sets of instances of traffic attributes and (ii) a reputation score for each instance in the new plurality of instances of traffic attributes, the reputation score for each instance in the new plurality of instances of traffic attributes being determined based on factors including at least:
the instances of traffic attributes in the new first and second sets of instances of traffic attributes;
the communications logged in the new first and second event logs;
an origin of the new first cyber threat intelligence data which originates either internal or external to the carrier network and an origin of the new second cyber threat intelligence data which originates either internal or external to the carrier network;
creating a third version of the threat list including at least the traffic attributes from the new plurality of instances of traffic attributes with a reputation score below a predetermined threshold reputation score.

2. The method defined in claim 1, wherein the third version of the threat list differs from the second version of the threat list.

3. The method defined in claim 1, wherein each version of the threat list includes a set of instances of traffic attributes.

4. The method defined in claim 3, wherein the third version of the threat list includes at least one instance of a traffic attribute that is absent from the second version of the threat list.

5. The method defined in claim 3, wherein the second version of the threat list includes at least one instance of a traffic attribute that is absent from the third version of the threat list.

6. The method defined in claim 5, wherein the third version of the threat list includes at least one instance of a traffic attribute that is absent from the second version of the threat list.

7. The method defined in claim 1, wherein the first and second cyber threat intelligence sources comprise network elements of a communications network equipped with traffic activity monitoring capabilities.

8. The method defined in claim 7, wherein the traffic activity monitoring capabilities include one or more of traffic flow monitoring, domain name server (DNS) query monitoring, message monitoring and peer-to-peer (P2P) session monitoring.

9. A system for refining cyber threat intelligence data, comprising:
network equipment in a carrier network controlled by a carrier network operator, configured to:
send a first version of a threat list to a first cyber threat intelligence source and to a second cyber threat intelligence source;
obtain original first cyber threat intelligence data from the first cyber threat intelligence source, the original first cyber threat intelligence data being issued by the first cyber threat intelligence source based on the first version of the threat list, the original first cyber threat intelligence data including an original first set of instances of traffic attributes deemed by the first cyber threat intelligence source to be suspicious and an original first event log relating to communications characterized by the original first set of instances of traffic attributes deemed by the first cyber threat intelligence source to be suspicious;
obtain original second cyber threat intelligence data from the second cyber threat intelligence source, the original second cyber threat intelligence data being issued by the second cyber threat intelligence source also based on the first version of the threat list, the original second cyber threat intelligence data including an original second set of instances of traffic attributes deemed by the second cyber threat intelligence source to be suspicious and an original second event log relating to communications characterized by the original second set of instances of traffic attributes deemed by the second cyber threat intelligence source to be suspicious;
determine (i) an original plurality of instances of traffic attributes from the original first and second sets of instances of traffic attributes and (ii) a reputation score for each instance in the original plurality of instances of traffic attributes, the reputation score for each instance in the original plurality of instances of traffic attributes being determined based on factors including at least:
the instances of traffic attributes in the original first and second set of instances of traffic attributes;
the communications logged in the original first and second event logs; and
an origin of the original first cyber threat intelligence data which originates either internal or external to the carrier network and an origin of the original second cyber threat intelligence data which originates either internal or external to the carrier network;
create a second version of the threat list a including at least the traffic attributes from the original plurality of instances of traffic attributes with a reputation score below a predetermined threshold reputation score;
send the second version of the thread list the first cyber threat intelligence source and to the second cyber threat intelligence source;
obtain new first cyber threat intelligence data from the first cyber threat intelligence source, the new first cyber threat intelligence data being issued by the first cyber threat intelligence source based on the second version of the threat list, the new first cyber threat intelligence data including a new first set of instances of traffic attributes deemed by the first cyber threat intelligence source to be suspicious and a new first event log relating to communications characterized by the new set of instances of traffic attributes deemed by the first cyber threat intelligence source to be suspicious;
obtain new second threat intelligence data from the second cyber threat intelligence source, the new second cyber threat intelligence data being issued by the second cyber threat intelligence source also based on the second version of the threat list, the new second cyber threat intelligence data including a new second set of instances of traffic attributes deemed by the second cyber threat intelligence source to be suspicious and a new second event log relating to communications characterized by the new set of instances of traffic attributes deemed by the second cyber threat intelligence source to be suspicious;
determine (i) a new plurality of instances of traffic attributes from the new first and second sets of instances of traffic attributes and (ii) a reputation score for each instance in the new plurality of instances of traffic attributes, the reputation score for each instance in the new plurality of instances of traffic attributes being determined based on factors including at least:
the instances of traffic attributes in the new first and second set of instances of traffic attributes;
the communications logged in the new first and second event logs;

an origin of the new first cyber threat intelligence data which originates either internal or external to the carrier network and an origin of the new second cyber threat intelligence data which originates either internal or external to the carrier network;

create a third version of the threat list including at least the traffic attributes from the new plurality of instances of traffic attributes with a reputation score below a determined threshold reputation score.

10. The system defined in claim 9, wherein the cyber threat intelligence report includes the reputation scores for the respective instances of traffic attributes included in the cyber threat intelligence report.

11. The system defined in claim 10, wherein the cyber threat intelligence report further includes logged event data from the first and second event logs pertaining to the instances of traffic attributes included in the cyber threat intelligence report.

12. The system defined in claim 11, wherein at least one of the first cyber threat intelligence source and the second cyber threat intelligence source is a gateway to a customer network having a plurality of users, and wherein the gateway correlates the logged event data with historical data to identify among the users, those that are potentially compromised.

13. The system defined in claim 9, wherein the second cyber threat intelligence source is controlled by an operator of a customer network having a plurality of users, the customer network being other than the carrier network.

14. The system defined in claim 9, wherein at least one of a first cyber threat intelligence source and to a second cyber threat intelligence source is a network element within a customer network having a plurality of users, the customer network being other than the carrier network.

15. The system defined in claim 14, wherein the carrier network provides Internet access to the customer network.

16. The system defined in claim 9, wherein the factors on which is based the reputation score for each instance in the plurality of instances of traffic attributes further includes:

a count of how many of cyber threat intelligence sources that have revealed a particular instance of the plurality of instances of traffic attributes.

17. The system defined in claim 9, wherein the factors on which is based on the reputation score for each instance in the plurality of instances of traffic attributes further includes:

a count of how many of logged events in the first and second event logs pertaining to a particular instance of the plurality of instances of traffic attributes.

* * * * *